(12) United States Patent
Niemelä

(10) Patent No.: US 11,824,831 B2
(45) Date of Patent: Nov. 21, 2023

(54) HOLE PUNCHING ABUSE

(71) Applicant: F-Secure Corporation, Helsinki (FI)

(72) Inventor: Jarno Niemelä, Helsinki (FI)

(73) Assignee: F-Secure Corporation, Helsinki (FI)

( * ) Notice: Subject to any disclaimer, the term of this patent is extended or adjusted under 35 U.S.C. 154(b) by 215 days.

(21) Appl. No.: 16/850,290

(22) Filed: Apr. 16, 2020

(65) Prior Publication Data

US 2020/0336460 A1    Oct. 22, 2020

(30) Foreign Application Priority Data

Apr. 17, 2019 (GB) ..................................... 1905409

(51) Int. Cl.
*G06F 21/00* (2013.01)
*H04L 9/40* (2022.01)

(52) U.S. Cl.
CPC ...... *H04L 63/0236* (2013.01); *H04L 63/1425* (2013.01)

(58) Field of Classification Search
CPC ............. H04L 63/0236; H04L 63/1425; H04L 63/0245; H04L 63/1458; H04L 63/029; H04L 43/50; H04L 61/2046; H04L 63/14
See application file for complete search history.

(56) References Cited

U.S. PATENT DOCUMENTS

| | | | |
|---|---|---|---|
| 2006/0018262 A1* | 1/2006 | Boulanger | H04L 63/1416 370/241 |
| 2006/0067220 A1* | 3/2006 | Poletto | H04L 63/1458 370/230.1 |
| 2011/0055322 A1* | 3/2011 | Gregersen | H04L 61/4535 709/203 |
| 2011/0088088 A1* | 4/2011 | Wang | H04L 63/02 726/12 |

(Continued)

FOREIGN PATENT DOCUMENTS

| | | |
|---|---|---|
| GB | 2353449 A | 2/2001 |
| WO | 2006/008307 A1 | 1/2006 |

OTHER PUBLICATIONS

Bryan Ford, et al, "Peer-to-Peer Communication Across Network Address Translators", USENIX Annual Technical Conference, https://www.usenix.org/legacy/event/usenix05/tech/general/full_papers/ford/ford_html/ (Year: 2005).*

(Continued)

*Primary Examiner* — Michael M Lee
(74) *Attorney, Agent, or Firm* — Meunier Carlin & Curfman LLC

(57) ABSTRACT

It is provided a method, comprising monitoring if a firewall receives a first packet and a second packet, wherein the first packet is directed to a IP address and a first port number; the second packet is directed to the IP address and a second port number; a hole through a firewall is punched for the IP address a hole port number different from the first port (Continued)

number and the second port number; the first packet has a first payload; the second packet has a second payload; and the method comprises checking if the first payload is substantially the same as the second payload; causing the firewall to block the first packet and the second packet if the firewall receives the first packet and the second packet and the first payload is substantially the same as the second payload.

16 Claims, 4 Drawing Sheets

(56) References Cited

U.S. PATENT DOCUMENTS

| | | |
|---|---|---|
| 2015/0365378 A1* | 12/2015 | Kim .................... H04L 63/1408 |
| | | 726/13 |
| 2018/0255018 A1* | 9/2018 | Liu ........................ H04L 67/563 |
| 2018/0262500 A1* | 9/2018 | De Kievit ........... H04W 12/088 |
| 2020/0059480 A1* | 2/2020 | Junod ................. H04L 63/1416 |
| 2020/0244685 A1* | 7/2020 | Meshi ................... H04L 63/166 |

OTHER PUBLICATIONS

Search Report completed by the Intellectual Property Office of the United Kingdom in Application No. GB1905409.7, dated Oct. 10, 2019. 1 page.

* cited by examiner

HOLE PUNCHING ABUSE

FIELD OF THE INVENTION

This application claims priority to and benefit of United Kingdom patent application serial number 1905409.7, filed Apr. 17, 2019, which is incorporated by reference and made a part hereof.

The present invention relates to hole punching abuse. In a particular case, it relates to detecting and preventing UDP hole punching abuse.

Abbreviations

DOS Denial of Service
GDPR General Data Protection Regulation
IOT Internet of Things
IP Internet Protocol
ISP Internet Service Provider
NAT Network Address Translation
P2P Peer to peer
UDP User Datagram Protocol
VM Virtual Machine

BACKGROUND

A significant number of IOT devices use UDP hole punching to enable P2P communication with a user's device (e.g. a mobile device). UDP hole punching may cut down server costs and avoids GDPR issues since no information is stored at ISP's server. The ISP server just does introduction between the IOT device and the user's device.

In order to establish UDP hole punching, both the IOT device and the user's device communicate to a server. In the server, it is registered in advance which user's device is allowed to communicate with which IOT device. As a result, the server gives to the IOT device and to the user's device the public IP address and UDP port number of the other party such that they can send messages to each other. When the devices first time send messages to each other, they will cause the respective firewalls to remember the UDP source and destination port and destination IP used, and when the other device responds using it's destination port as source and other devices source port as destination, the message will be routed through the firewall to the intended target.

FIG. 1 shows a flowchart of UDP hole punching according to the prior art. Here, UDP hole punching is used to set up a direct communication between a Device A (having IP address A and using port A for the direct communication) and a Sensor B (having IP address B and using port B for the direct communication). Device A is an example of a user's device, and sensor B is an example of an IOT device. Server S (having IP address S and using port S for the communication with sensor B) is used to set up the direct communication. Server S is aware that a direct communication is to be set up between Device A (IP A) and Sensor B (IP B), e.g. according to a table stored in server S. In addition, server S knows that Device A uses Port A for the direct communication, e.g. by a mechanism corresponding to that shown below in messages 1 and 3 for sensor B. The communication with sensor B goes through a firewall F. For simplicity, it is assumed that initially, the firewall is closed such that communication from external cannot pass to sensor B.

The actions shown in FIG. 1 are as follows. All the messages are UDP messages. The detailed messages may be implementation specific. An example of such messages is given further below when the attack is explained.

1: Sensor B knows that the direct communication is to be set up via server S. In order to set up the direct communication, sensor B sends a UDP message to server S (source: IP B, Port B; Destination: IP S, Port S).
2: Due to message 1, the firewall opens for communication between sensor B and server S, i.e. between IP B, Port B and IP S, Port S.
3: Message 1 is passed through the firewall to Server S.
4: Server S checks its stored table and identifies that a direct connection is to be set up between IP A, port A, and IP B. It adds Port B to this entry.
5: Server S replies to message 3 by a message comprising IP S, Port S as source address, IP B and Port B as destination address, and IP A and Port A as payload.
6: Since the firewall is open for communication between server S and sensor B, the firewall passes message 5 to sensor B.
7: From message 6, sensor B understands that the direct communication is to be set up to IP A, Port A. Thus, sensor B sends a message to device A. This message has IP B, port B as source address and IP A, port A as destination address.
8: Due to message 7, the firewall F opens for communication between Device A (IP A, port A) and sensor B (IP B, port B). Now, device A and sensor B can communicate directly with each other. For example, device A may read out the sensor B or may take control over it.
9: Message 7 is passed through the firewall F to Device A.

SUMMARY OF THE INVENTION

It is an object of the present invention to improve the prior art.

According to a first aspect of the invention, there is provided an apparatus, comprising monitoring means configured to monitor if a firewall receives a first packet and a second packet, wherein the first packet is directed to a IP address and a first port number; the second packet is directed to the IP address and a second port number different from the first port number; a hole through a firewall is punched for the IP address such that the firewall passes packets directed to the IP address and a hole port number different from the first port number and the second port number; the first packet has a first payload; the second packet has a second payload; and the apparatus further comprises checking means configured to check if the first payload is the same or substantially the same as the second payload; blocking means configured to cause the firewall to block the first packet and the second packet if the firewall receives the first packet and the second packet and the first payload is the same or substantially the same as the second payload.

According to a second aspect of the invention, there is provided an apparatus, comprising obtaining means configured to obtain a server IP address and a server port number, wherein a server communicates with a device having a device IP number from the server IP address and the server port number; sending means configured to send a packet to the device, wherein the packet is addressed to the device IP address and a preliminary device port number and comprises the server IP address and the server port number as a source address; monitoring means configured to monitor if the packet to the device is blocked by a firewall; repeating means configured to repeat the sending and the monitoring until the respective packet to the device is not blocked, wherein each of the packets of the repetitions is addressed to the device IP address and a respective preliminary device port number and comprises the server IP address and the server port number as the source address; and the respective preliminary device port numbers of different repetitions are different from each other.

According to a third aspect of the invention, there is provided a method, comprising monitoring if a firewall receives a first packet and a second packet, wherein the first packet is directed to a IP address and a first port number; the second packet is directed to the IP address and a second port number different from the first port number; a hole through a firewall is punched for the IP address such that the firewall passes packets directed to the IP address and a hole port number different from the first port number and the second port number; the first packet has a first payload; the second packet has a second payload; and the method further comprises checking if the first payload is the same or substantially the same as the second payload; causing the firewall to block the first packet and the second packet if the firewall receives the first packet and the second packet and the first payload is the same or substantially the same as the second payload.

According to a fourth aspect of the invention, there is provided a method, comprising obtaining a server IP address and a server port number, wherein a server communicates with a device having a device IP number from the server IP address and the server port number; sending a packet to the device, wherein the packet is addressed to the device IP address and a preliminary device port number and comprises the server IP address and the server port number as a source address; monitoring if the packet to the device is blocked by a firewall; repeating the sending and the monitoring until the respective packet to the device is not blocked, wherein each of the packets of the repetitions is addressed to the device IP address and a respective preliminary device port number and comprises the server IP address and the server port number as the source address; and the respective preliminary device port numbers of different repetitions are different from each other.

Each of the methods of the third and fourth aspects may be a method of hole punching.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

Further details are set out in the dependent claims.

According to some example embodiments of the invention, at least one of the following advantages may be achieved:

Attacks based on UDP hole punching may be prevented;
Access to the UDP device (such as a sensor) may be (re-)gained.

Further advantages become apparent from the following detailed description.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred example embodiments of the present invention which is to be taken in conjunction with the appended drawings, wherein.

DETAILED DESCRIPTION OF CERTAIN EXAMPLE EMBODIMENTS

Herein below, certain example embodiments of the present invention are described in detail with reference to the accompanying drawings, wherein the features of the example embodiments can be freely combined with each other unless otherwise described. However, it is to be expressly understood that the description of certain example embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Many UDP hole punching protocols (i.e. messages exchanged to enable UDP hole punching) are unencrypted and do not use nonces or other attack protections.

As a consequence, an attacker may make an educated guess or traffic reverse engineering about the server IP address and server destination UDP port, and then, fake a response that looks exactly like as if it is coming from the server. In traffic reverse engineering, the attacker sets up a device that is identical or close enough to target records the traffic. From the recording, one can see to which server the device is communicating to, and what is the protocol structure of this communication.

From such an educated guess or traffic reverse engineering, the attacker typically does not know the port that the IOT device is using for the server communication. According to some embodiments of the invention, the attacker mass spams UDP packets trying many possible UDP port number until one of them succeeds (i.e. passes through the firewall of the sensor).

The firewall typically blocks such crude UDP port scan, except for the port number(s) that is already allowed and forwarded as UDP hole. This means that one can push hundreds of packets per second, and may get the UDP hole packet through the firewall when the port number is right.

As the packets sent by the attacker's server (it may be just a computer, server functionality is not required) comprise a forged source address (that of the "correct" server), mass spam of UDP packets may be performed from one or several devices. For example, in order to avoid that the ISP of the attacker gets suspicious, he may send the UDP packets from a botnet, or from many (e.g. hundreds) very cheap VMs in one or more cloud providers. The IP address where the IOT device is supposed to punch a hole is in the UDP packet payload data, so what device is sending the forged UDP messages does not matter.

Figure 1:
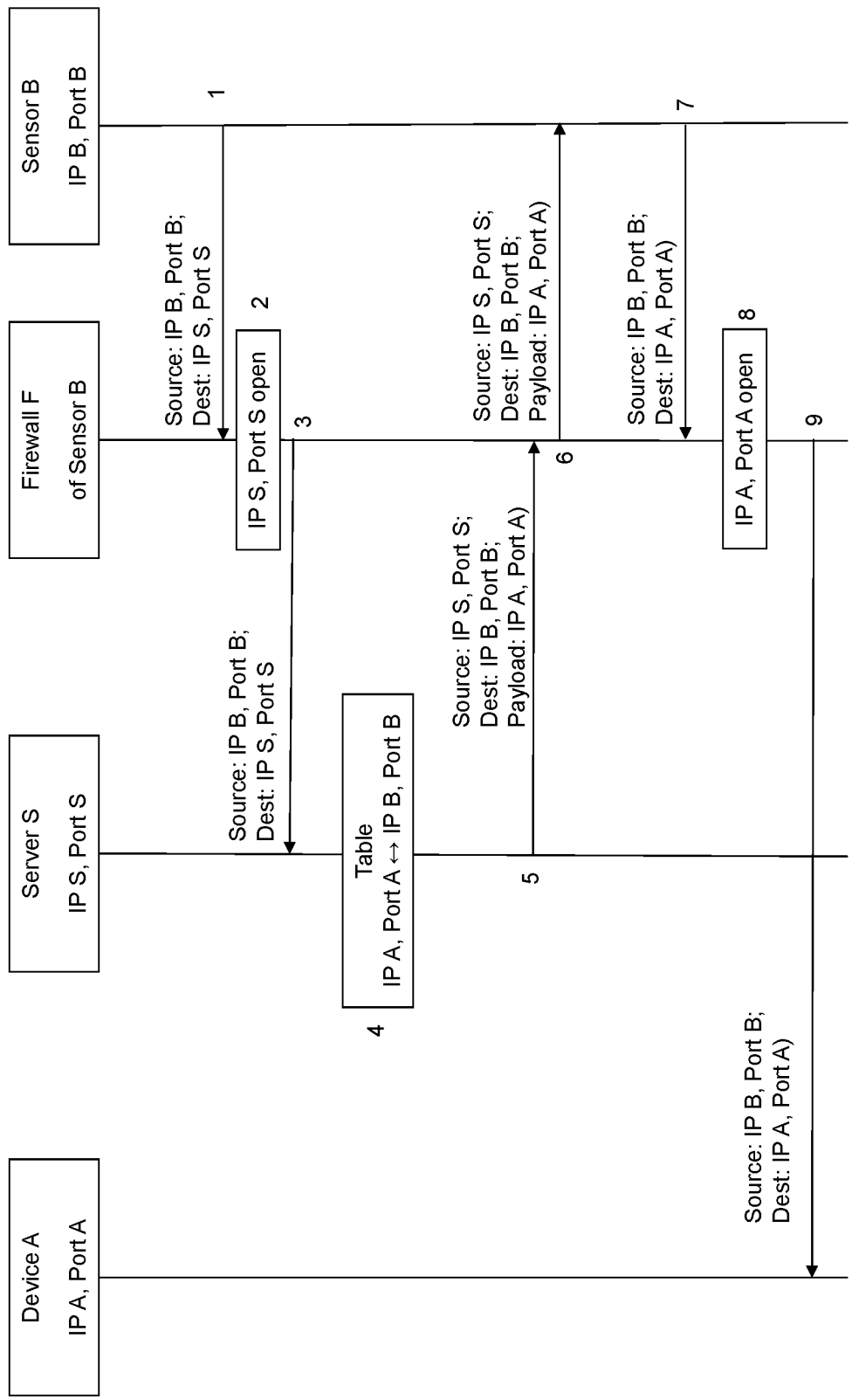
FIG. 1 shows a message flow according to the prior art.

Even if the ISP starts filtering packets (like the firewall), the ISP has to allow already established connections, such as the one between the server S and the sensor B of FIG. 1.

Figure 2:
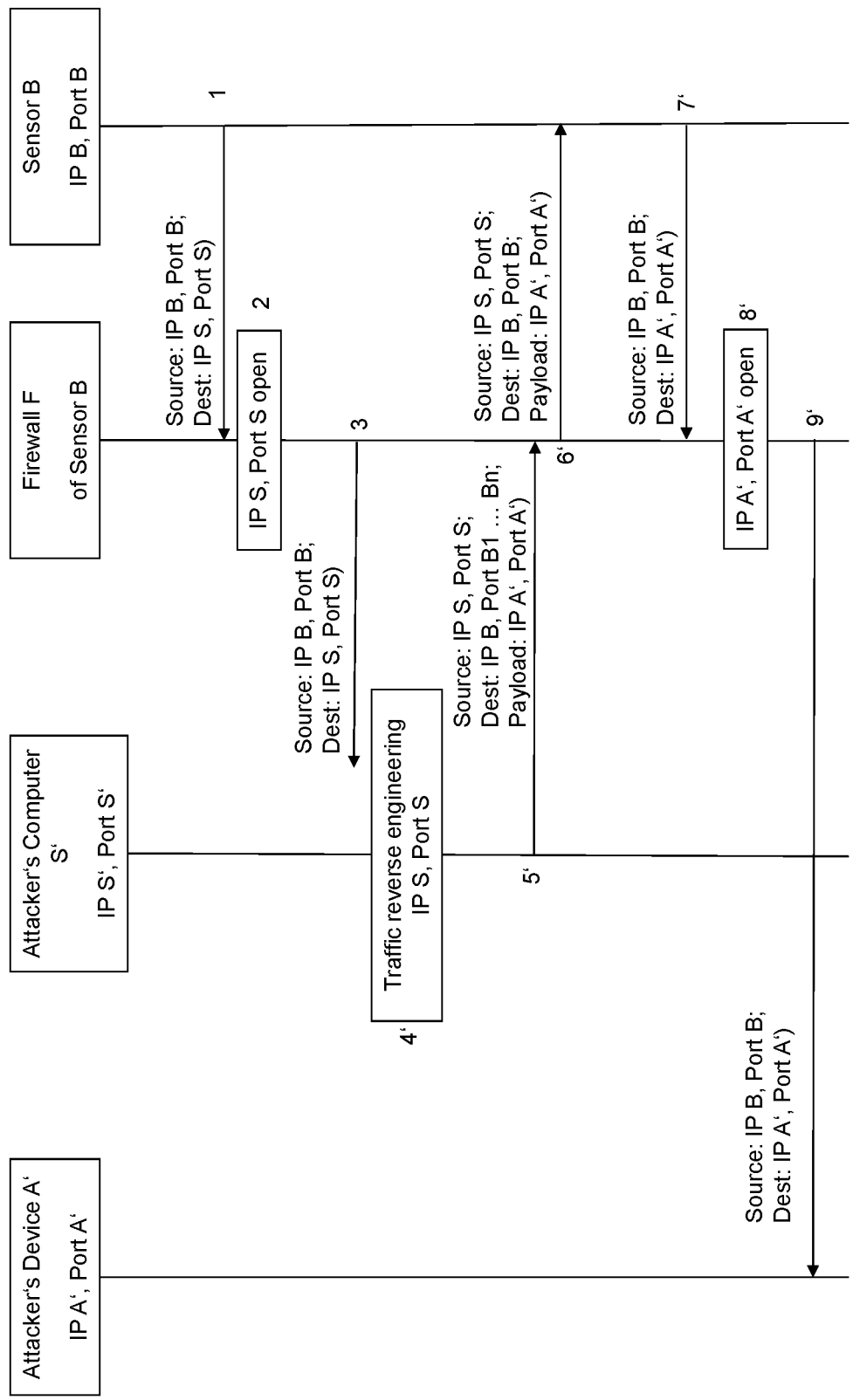
FIG. 2 shows a message flow according to some embodiments of the invention.

FIG. 2 shows a message flow corresponding to that of FIG. 1, but for an attack according to some embodiments of the invention. In FIG. 2, the server S of FIG. 1 is replaced by an attackers computer S' and the Device A is replaced by an attacker's device A'. Attacker's computer S' may comprise plural computers (e.g. a botnet) or virtual machines.

Actions 1 to 3 are the same as those shown in FIG. 1. Message 3 does not reach attacker's server S' because attacker's server S' has a different address (IP S', port S') than server S of FIG. 1, to which message 3 is directed.

4': Attacker's server S' (or a user thereof) guesses by an educated guess or by traffic reverse engineering the address (IP S, port S) of server S.

5': Attacker's server S' sends a message 5' corresponding to message 5 of FIG. 1 to sensor B. The source address of message 5' is a forged one, namely IP S, port S of server S, taken from the educated guess or the traffic reverse engineering of action 4. The destination IP address IP B is known to the attacker as the target of the attack. The destination port is not known. Here, attacker's server S' may try an arbitrary port such as port B1. If this attempt is not successful, it may try further ports B2, . . . , Bn until one of these ports is port B, which is open for communication between sensor B and server S.

The payload of message 5' comprises IP A', port A', the address of the attacker's device A'.

Attacker's computer S' need not to wait for sending another message 5' with a different destination port Bi+1 until it receives an indication that previously sent message 5' with port Bi (i=1 . . . n−1) was rejected by the firewall F. It may send plural messages S' in parallel or with short time intervals without waiting for a response.

6': If the port Bi included in the message 5' corresponds to the port B, the firewall passes message 5' to the sensor B.

7': From message 6', sensor B understands that the direct communication is to be set up to IP A', Port A'. Thus, sensor B sends a message to device A'. This message has IP B, port B as source address and IP A', port A' as destination address.

8': Due to message 7', the firewall F opens for communication between attacker's device A' (IP A', port A') and sensor B (IP B, port B). Now, attacker's device A' and sensor B can communicate directly with each other. For example, attacker's device A' may read out the sensor B and/or may take control over it.

9': Message 7' is passed through the firewall F to attacker's device A'.

The IP addresses IP A, IP A' IP B, IP S, and IP S' of FIGS. 1 and 2 are public IP addresses. If NAT is applied on the firewall F, the firewall may perform address translation, such that an internal IP address and an internal port number is used between the firewall and Sensor B. The same applies correspondingly to each of devices A, A', server S, and computer S' if NAT is used for it.

Table 1 shows a simple proof of concept of the attack. It has been tested against multiple different firewalls. It spoofs UDP hole punch response for IP security cameras using P2PCam backend at IP 54.221.213.97 (Amazon AWS) and destination port 32100. The destination for spoofed UDP hole is fs044-104-175-095.freedome-vpn.net (95.175.104.44) port 21748.

TABLE 1

Proof of concept of the attack according
to some embodiments of the invention

```
from scapy.all import *
import random
ports=list( )
for i in range(10000,33000):
    ports.append(i)
random.shuffle(ports)
counter=0
for port in ports:
    ip = IP(dst ="10.42.0.11", src ='54.221.213.97')
    udp = UDP(sport=32100, dport=port)
    payload =
b'\xf1\x40\x00\x10\x00\x02\xf4\x54\x2c\x68\xaf\x5f\x00\x00\x00\x00\x00\x00\x00\x00'
    packet = ip / udp / payload
    send(packet)
    counter+=1
    print(counter)
```

As said above, the firewall cannot filter out the incoming UDP packet when the attacker gets the port number right. Otherwise, one would allow the attacker to do a DOS attack instead of firewall bypass attack.

Instead, according to some embodiments of the invention, it is identified that a mass spam of UDP packets from a same source IP with substantially or exactly identical payload is received. One may identify this payload and drop all messages containing substantially or exactly this payload. Since the attacker's intended UDP hole (destination IP address and UDP port; e.g. IP A' and port A' in FIG. 2) is in the payload, and the attacker cannot really change that, which means the payload has to stay static.

The following steps may be performed according to some embodiments of the invention:

1. Identify when a firewall receives UDP packets from a source IP address for which there is an UDP hole punched, wherein some of the received UDP packets comprise destination port numbers for which there is no active UDP hole.
2. Check if the payload of these UDP packets are identical or substantially identical (less than IP address size variance)
3. Optionally check if the payload comprises a numeric sequence that matches a possible IP address. The IP address may be public or private. If the payload does not comprise such a numeric sequence, the packet is blocked by the normal firewall rules.
4. Start blocking all UDP packets from source IP address that have payload identical or substantially identical to the payload used for UDP mass spam.
5. Still allow UDP packets which have non-identical payload. That is, pass packets indicating a different UDP hole destination address and port in the payload.

Figure 4:
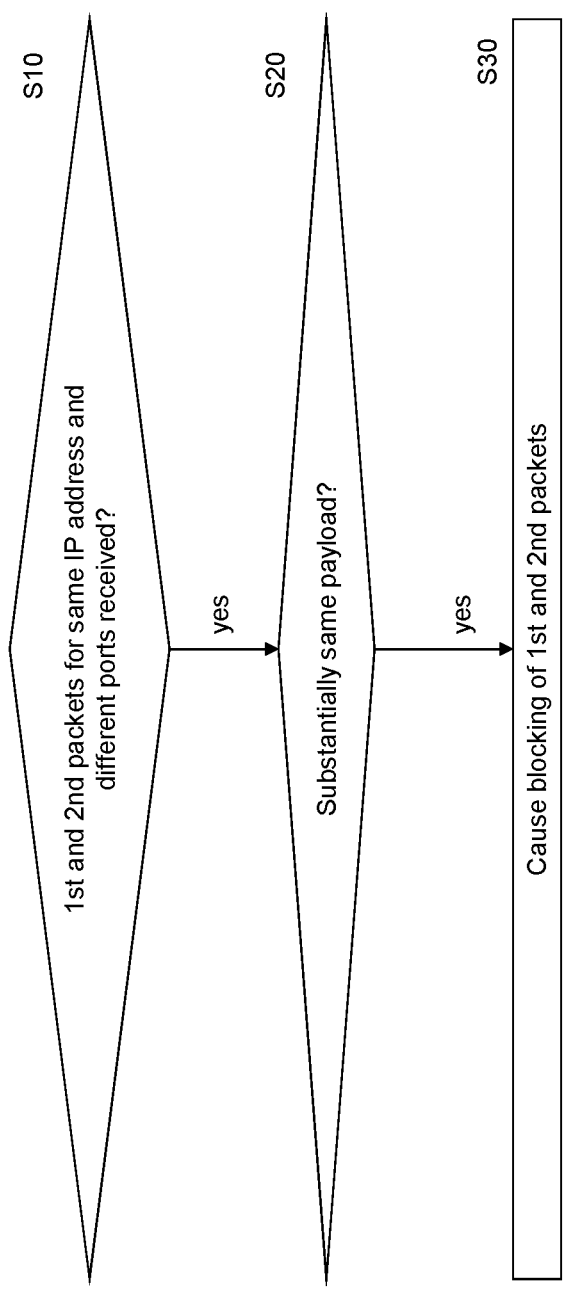
FIG. 4 shows a method according to an embodiment of the invention.
Figure 3:
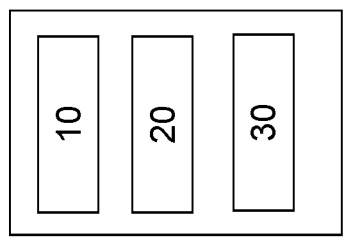
FIG. 3 shows an apparatus according to an embodiment of the invention.

FIG. 3 shows an apparatus according to an example embodiment of the invention. The apparatus may be a firewall or an element thereof. FIG. 4 shows a method according to an example embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises monitoring means 10, checking means 20, and blocking means 30. The monitoring means 10, checking means 20, and blocking means 30 may be a monitor, checker, and blocker, respectively. The monitoring means 10, checking means 20, and blocking means 30 may be a monitoring processor, checking processor, and blocking processor, respectively.

The monitoring means 10 monitors if a firewall receives a first packet and a second packet (S10). The first packet is directed to a IP address and a first port number. The second packet is directed to the IP address (i.e., the same IP address) and a second port number different from the first port number. A hole through a firewall is punched for the IP address (i.e., again the same IP address) such that the firewall passes packets directed to the IP address and a port number ("hole port number") different from the first port number and the second port number. The first packet has a first payload; and the second packet has a second payload.

The checking means 20 checks if the first payload is the same or substantially the same as the second payload (S20). The first payload is substantially the same as the second payload if the first payload comprises a first numeric sequence corresponding to a first device IP address and the second payload comprises a second numeric sequence corresponding to a second device IP address, the first device IP address is the same as the second device IP address, and a size of the first numeric sequence is different from a size of the second numeric sequence.

S10 and S20 may be performed in an arbitrary sequence. They may be performed fully or partly in parallel.

If the firewall receives the first packet and the second packet (S10=yes) and if the first payload is the same or substantially the same as the second payload (S20=yes), the blocking means 30 causes the firewall to block the first packet and the second packet (S30). In this case, it is assumed that the packets belong to an attack as described hereinabove.

Figure 6:
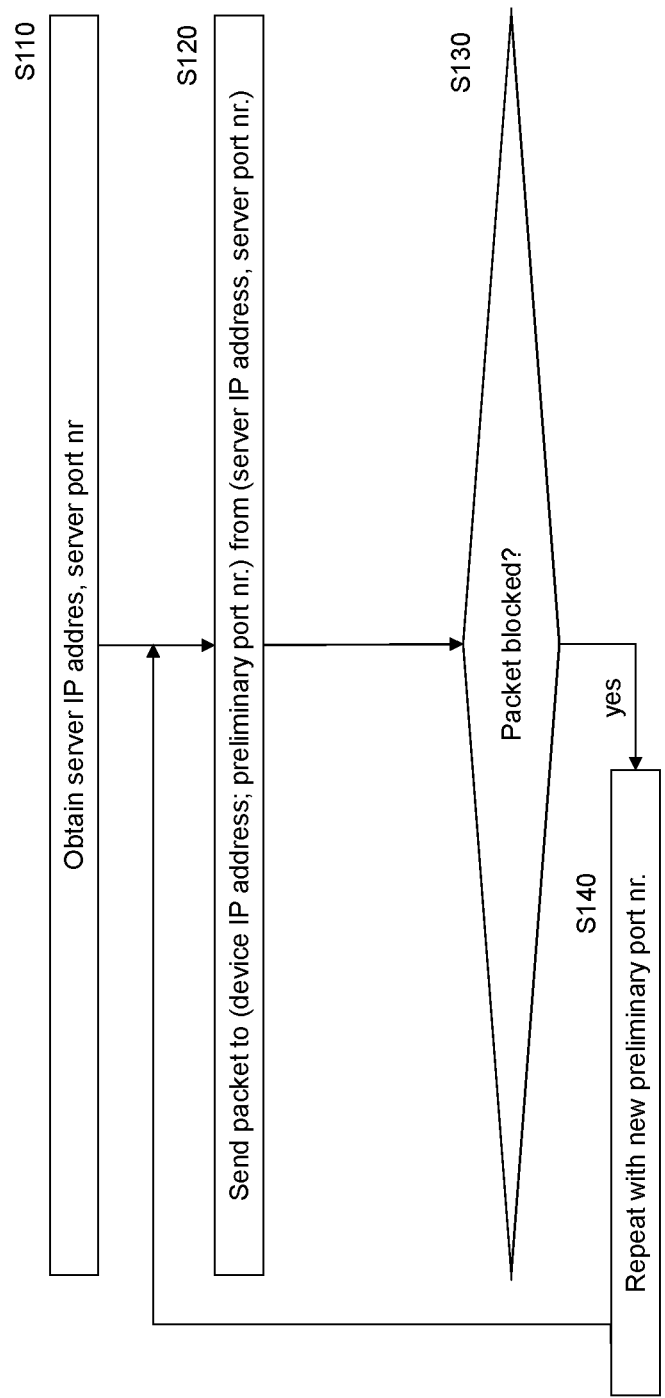
FIG. 6 shows a method according to an embodiment of the invention.
Figure 5:
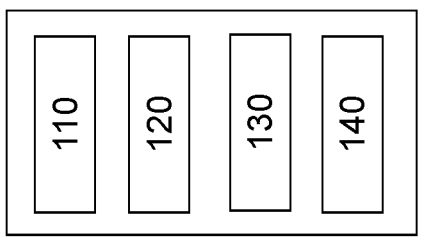
FIG. 5 shows an apparatus according to an embodiment of the invention.

FIG. 5 shows an apparatus according to an example embodiment of the invention. The apparatus may be a computer such as an attacker's computer or an element thereof. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises obtaining means 110, sending means 120, monitoring means 130, and repeating means 140. The obtaining means 110, sending means 120, monitoring means 130, and repeating means 140 may be an obtainer, sender, monitor, and repeater, respectively. The obtaining means 110, sending means 120, monitoring means 130, and repeating means 140 may be a obtaining processor, sending processor, monitoring processor, and repeating processor, respectively.

The obtaining means 110 obtains a server IP address and a server port number (S110). A server communicates with a device having a device IP number from the server IP address and the server port number.

The sending means 120 sends a packet to the device (S120). The packet is addressed to the device IP address and a preliminary device port number and comprises the server IP address and the server port number as a source address.

The monitoring means 130 monitors if the packet to the device is blocked by a firewall (S130).

The repeating means 140 repeats the sending and the monitoring until the respective packet to the device is not blocked (S140). Each of the packets of the repetitions is addressed with the device IP address and a respective preliminary device port number and comprises the server IP address and the server port number as the source address. The respective preliminary device port numbers of different repetitions are different from each other.

Figure 7:
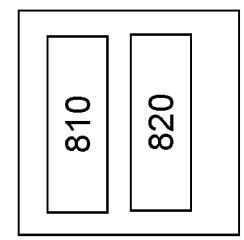
FIG. 7 shows an apparatus according to an embodiment of the invention.

FIG. 7 shows an apparatus according to an example embodiment of the invention. The apparatus comprises at least one processor 810 and at least one memory 820 including computer program code, and the at least one processor 810, with the at least one memory 820 and the computer program code, being arranged to cause the apparatus to at least perform at least one of the methods according to FIGS. 4 and 6 and related description.

Some embodiments are explained with respect to UDP. UDP is an example of a sessionless protocol. Some embodiments of the invention may be applied to other sessionless protocols than UDP.

Some embodiments of the invention are explained with respect to an IOT device such as a sensor. However, the invention is not limited to IoT devices but may be applied to arbitrary UDP devices (devices communicating via UDP, or more generally: communicating via a sessionless protocol). Also, the attacker's device is not limited in any way except that it is capable of communicating in the sessionless protocol (e.g. UDP). The attacker's device and the attacker's computer of FIG. 2 may be a same device or different devices.

Some embodiments of the invention are explained where the attacker may perform a potentially malicious attack. However, the invention is not limited to such malicious attacks. For example, according to some embodiments of the invention, the "attack" may be used to enable lawful interception of the IoT device. As a still other option, the attack may be used if the authorized staff cannot access the IoT device anymore due to some misconfiguration.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a firewall, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a computer such as an attacker's computer, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. An apparatus, comprising
a firewall having a processor; and
a memory having instructions stored thereon for one or more firewall rules to detect mass spam of UDP packets from same source IP with identical payload to prevent hole punch abuse, wherein execution of the instructions by the processor causes the processor to:
establish UDP hole punching with one or more devices communicating via UDP;
monitor, via the one or more firewall rules to prevent hole punch abuse, when the firewall receives a first packet and a second packet, wherein:
the first packet includes an IP address and a first port number;
the second packet includes the IP address and a second port number different from the first port number;
a hole through a firewall is punched for the IP address such that the firewall passes packets directed to the IP address and a hole port number different from the first port number and the second port number;
the first packet has a first payload;
the second packet has a second payload;
check, via the one or more firewall rules, whether the first payload, or a portion thereof, is the same as the second payload, or a portion thereof when the one or more firewall rules for the monitoring is met; and
block, via the one or more firewall rules, the first packet and the second packet when the one or more firewall rules for the checking is met to prevent hole punch abuse.

2. The apparatus according to claim 1, wherein the execution of the instructions by the processor further causes the processor to:
inhibit the blocking of the first packet and the second packet when the first payload, or a portion thereof, is not the same as the second payload, or a portion thereof.

3. The apparatus according to claim 1, wherein the execution of the instructions by the processor causes the processor to monitor whether the firewall receives a third packet;
wherein the third packet is directed to the IP address and a third port number different from the first port number and different from the second port number;
wherein the third packet has a third payload;
wherein the execution of the instructions by the processor causes the processor to check whether the third payload is the same as at least one of the first payload and the second payload; and
wherein the execution of the instructions by the processor causes the processor to cause the firewall to block the third packet when the third payload, or a portion thereof, is the same as at least one of the first payload and the second payload, or a portion thereof.

4. The apparatus according to claim 3, wherein the execution of the instructions by the processor causes the processor to inhibit the blocking of the third packet when the third payload, or a portion thereof, is not the same as the first payload, or a portion thereof, and not the same as the second payload, or a portion thereof.

5. The apparatus according to claim 1, wherein the first payload comprises a first numeric sequence corresponding to a first device IP address and the second payload comprises a second numeric sequence corresponding to a second device IP address, and wherein the execution of the instructions by the processor further causes the processor to determine the first payload, or a portion thereof, is the same as the second payload, or a portion thereof, when the first device IP address is the same as the second device IP address and a size of the first numeric sequence is different from a size of the second numeric sequence.

6. The apparatus according to claim 1, wherein the execution of the instructions by the processor further causes the processor to:
supervise when the first payload comprises a third numeric sequence corresponding to a third device IP address;
wherein inhibition of the blocking of the first packet occurs when the first payload does not comprise the third numeric sequence.

7. The apparatus according to claim 1, wherein each of the first packet and the second packet is a packet of a sessionless protocol.

8. A method, comprising:
establishing UDP hole punching with one or more IoT devices or a device communicating via UDP;
monitoring, via one or more firewall rules to prevent hole punch abuse, when a firewall receives a first packet and a second packet, wherein:
the first packet is directed to an IP address and a first port number;
the second packet is directed to the IP address and a second port number different from the first port number;
a hole through a firewall is punched for the IP address such that the firewall passes packets directed to the IP address and a hole port number different from the first port number and the second port number;
the first packet has a first payload; and
the second packet has a second payload;
checking, via the one or more firewall rules to prevent hole punch abuse, whether the first payload, or a portion thereof, is the same as the second payload, or a portion thereof when the one or more firewall rules for the monitoring is met; and
causing, via the one or more firewall rules, the firewall to block the first packet and the second packet to prevent hole punch abuse when the one or more firewall rules for the checking is met.

9. The method according to claim 8, further comprising inhibiting the blocking of the first packet and the second packet when the first payload, or a portion thereof, is not the same as the second payload, or a portion thereof.

10. The method according to claim 8, further comprising monitoring whether the firewall receives a third packet;
wherein the third packet is directed to the IP address and a third port number different from the first port number and different from the second port number;
wherein the third packet has a third payload;
checking whether the third payload is the same as at least one of the first payload and the second payload; and
causing the firewall to block the third packet to prevent hole punch abuse when the third payload, or a portion thereof, is the same as at least one of the first payload and the second payload, or a portion thereof.

11. The method according to claim 10, further comprising inhibiting the blocking of the third packet when the third payload, or a portion thereof, is not the same as the first payload, or a portion thereof, and not the same as the second payload, or a portion thereof.

12. The method according to claim 8,
wherein the first payload comprises a first numeric sequence corresponding to a first device IP address and the second payload comprises a second numeric sequence corresponding to a second device IP address, determining a portion of the first payload, is the same as the second payload, or a portion thereof, when the first device IP address is the same as the second device IP address and a size of the first numeric sequence is different from a size of the second numeric sequence.

13. The method according to claim 8, further comprising supervising when the first payload comprises a third numeric sequence corresponding to a third device IP address; and
inhibiting the blocking of the first packet when the first payload does not comprise the third numeric sequence.

14. The method according to claim 8, wherein each of the first packet and the second packet is a packet of a sessionless protocol.

15. A non-transitory computer program product comprising a set of instructions, which when executed on an apparatus, cause the apparatus to:

establish UDP hole punching with one or more IoT devices or a device communicating via UDP;

monitor when a firewall receives a first packet and a second packet, wherein:

the first packet is directed to an IP address and a first port number, the second packet is directed to the IP address and a second port number different from the first port number, a hole through a firewall is punched for the IP address such that the firewall passes packets directed to the IP address and a hole port number different from the first port number and the second port number, the first packet has a first payload, and the second packet has a second payload; and check whether the first payload, or a portion thereof, is the same as the second payload, or a portion thereof when one or more firewall rules for the monitoring is met; and cause the firewall to block the first packet and the second packet to prevent hole punch abuse when the one or more firewall rules for the checking is met.

16. The computer program product according to claim 15, embodied as a computer-readable medium or directly loadable into a computer.

* * * * *